(12) United States Patent
Lin et al.

(10) Patent No.: US 10,845,925 B2
(45) Date of Patent: Nov. 24, 2020

(54) ELECTRONIC DEVICE HAVING FORCE SENSOR AIR FLOW PROMOTION STRUCTURES

(71) Applicant: Apple Inc., Cupertino, CA (US)

(72) Inventors: Wei Lin, Mountain View, CA (US); Henry E. Herman, III, Santa Clara, CA (US); Po-Jui Chen, Taipei (TW); Robert W. Rumford, Santa Clara, CA (US); Steve L. Terry, El Granada, CA (US); Yindar Chuo, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 71 days.

(21) Appl. No.: 16/212,488

(22) Filed: Dec. 6, 2018

(65) Prior Publication Data

US 2019/0179450 A1 Jun. 13, 2019

Related U.S. Application Data

(63) Continuation of application No. 15/175,536, filed on Jun. 7, 2016, now abandoned.

(60) Provisional application No. 62/206,428, filed on Aug. 18, 2015.

(51) Int. Cl.
*G06F 3/044* (2006.01)
(52) U.S. Cl.
CPC .... *G06F 3/044* (2013.01); *G06F 2203/04105* (2013.01)

(58) Field of Classification Search
None
See application file for complete search history.

(56) References Cited

U.S. PATENT DOCUMENTS

| 6,694,814 | B2 | 2/2004 | Ishio | |
|---|---|---|---|---|
| 8,601,885 | B2 | 12/2013 | Delapierre et al. | |
| 2009/0219259 | A1 | 9/2009 | Kwon | |
| 2012/0193211 | A1* | 8/2012 | Ciesla | G06F 3/044 200/81 H |
| 2013/0234734 | A1* | 9/2013 | Iida | G01L 1/146 324/661 |
| 2015/0062068 | A1 | 3/2015 | Shih et al. | |

(Continued)

*Primary Examiner* — Amare Mengistu
*Assistant Examiner* — Sarvesh J Nadkarni
(74) *Attorney, Agent, or Firm* — Treyz Law Group, P.C.; G. Victor Treyz; Kendall W. Abbasi

(57) ABSTRACT

An electronic device such as a device with a display may have a force sensor. The force sensor may include capacitive electrodes separated by a deformable layer such as a layer of an elastomeric polymer. The display or other layers in the electronic device may deform inwardly under applied force from a finger of a user or other external object. As the deformed layers contact the deformable layer, the deformable layer is compressed and the spacing between the capacitive electrodes of the force sensor decreases. This causes a measurable rise in the capacitance signal and therefore the force signal output of the force sensor. To prevent the deformable layer from sticking to the inner surface of the display layers, air flow promotion structures may be interposed between the deformable layer and the inner surface of the display. The air flow promotion structures may include spacer pads with anti-stick surfaces.

29 Claims, 21 Drawing Sheets

(56) References Cited

U.S. PATENT DOCUMENTS

2015/0277626 A1* 10/2015 Shinkai .............. G06F 3/04886
                                                        345/174
2015/0293160 A1    10/2015 Kasai et al.
2016/0103542 A1     4/2016 Ogata et al.

* cited by examiner

ELECTRONIC DEVICE HAVING FORCE SENSOR AIR FLOW PROMOTION STRUCTURES

This application is a continuation of patent application Ser. No. 15/175,536, filed Jun. 7, 2016, which claims the benefit of provisional patent application No. 62/206,428, filed Aug. 18, 2015, both of which are hereby incorporated by reference herein in their entireties.

BACKGROUND

This relates generally to electronic devices and, more particularly, to electronic devices with force sensors.

Electronic devices such as laptop computers may be provided with displays to provide visual output and track pads and other devices to gather touch and force input from a user. In some electronic devices such as tablet computers and cellular telephones, touch screens are used to display visual information and gather touch input.

There are challenges associated with implementing sensors such as force and touch sensors in an electronic device. If care is not taken, sensor measurements may be less accurate than desired or devices may be more bulky than desired.

It would therefore be desirable to be able to provide improved sensor arrangements for electronic devices.

SUMMARY

An electronic device such as a device with a display may have a force sensor. The force sensor may include capacitive electrodes separated by a deformable layer such as a layer of an elastomeric polymer. The electrodes may include an upper set of electrodes formed in an array pattern and a lower electrode on an opposing surface of the elastomeric polymer layer. Force sensor circuitry may make capacitance measurements between the capacitor electrode structures on the opposing surfaces of the elastomeric layer.

The display may have a backlight unit and a display module that is backlit by the backlight unit or may have other display layers. The display layers or other layers in the electronic device may bend inwardly under force from a finger of a user or other external object applied to the surface of the display or other external surface of the electronic device. These layers may be separated from the deformable layer by an air gap. When bent inwardly, the bent layers may come into contact with the deformable layer.

As the bent layers contact the deformable layer, the deformable layer becomes compressed and the spacing between the capacitive electrodes of the force sensor decreases. This causes a measurable rise in the capacitance associated with the electrodes and therefore a rise in the force signal output of the force sensor. When the user's finger is released from the bent layers or the applied external force is otherwise removed, the bent layers will experience a restoring force that moves the bent layers outwardly toward their original (unbent) position.

To prevent the deformable layer from sticking to the contacting surface of the display layers as a result of smooth-surface-to-smooth-surface contact and/or due to adhesion of the contacting layers to each other, air flow promotion structures may be interposed between the deformable layer and the contacting surface of the display layer. The air flow promotion structures may include spacer pads and anti-stick surfaces. The spacer pads may create air flow channels to help ensure adequate air flow into the air gap between the display layers and deformable layer as the display layers spring back to their original (unbent) position. The anti-stick surfaces may include textured surface structures and hydrophobic coatings to reduce adhesion to the display layers.

DETAILED DESCRIPTION

Figure 1:
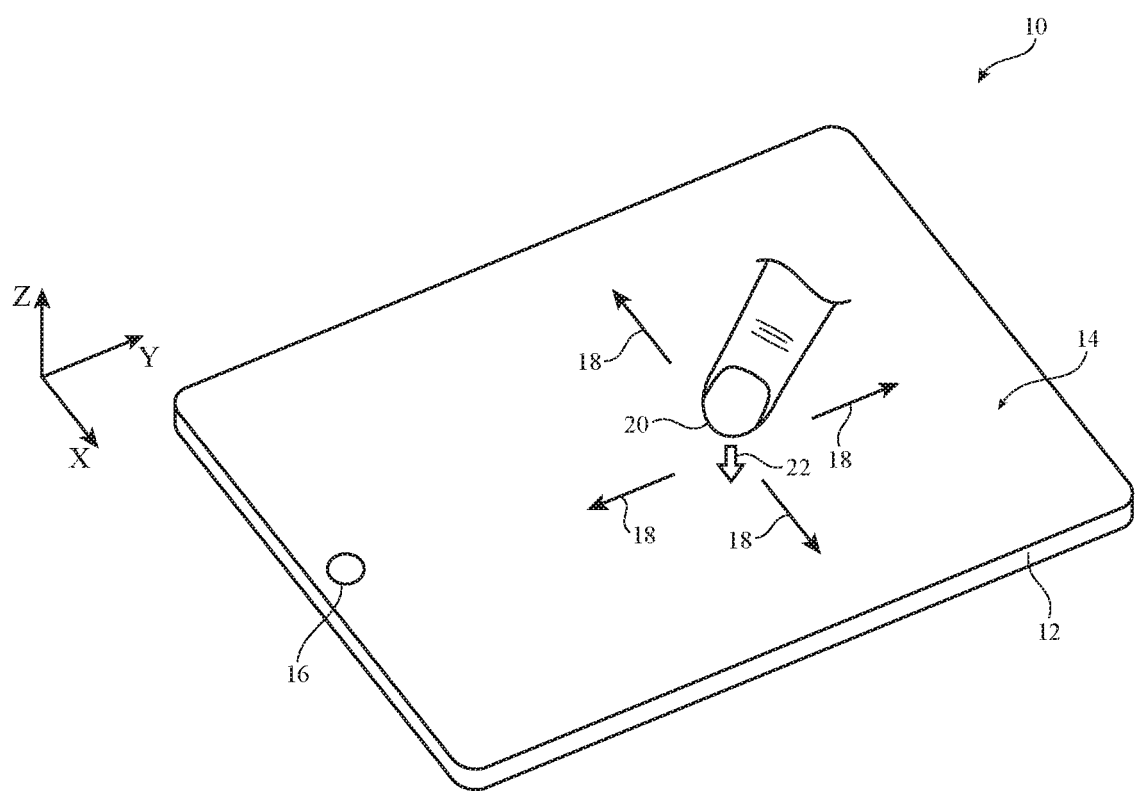
FIG. 1 is a perspective view of an illustrative electronic device in accordance with an embodiment.

An electronic device such as electronic device 10 of FIG. 1 may have sensors such as force and touch sensors and a display such as display 14. The sensors of device 10 may be integrated with display 14 (e.g., display 14 may include a touch sensor and force sensor that overlaps the pixels of display 14) and/or device 10 may have a trackpad or other structure that gathers force and/or touch sensor input on a portion of device 10 that is separate from display 14. Illustrative configurations for device 10 in which touch and/or force input is gathered by touching and pressing against display 14 are sometimes described herein as an example.

Device 10 may be a handheld electronic device such as a cellular telephone, media player, gaming device, or other device, may be a laptop computer, tablet computer, or other portable computer, may be a desktop computer, may be a computer display, may be a display containing an embedded computer, may be a television or set top box, may be a tablet computer that is attached to a detachable cover with a keyboard or other accessory, or may be other electronic equipment.

As shown in the example of FIG. 1, device 10 may have a housing such as housing 12. Housing 12 may be formed from plastic, metal (e.g., aluminum), fiber composites such as carbon fiber, glass, ceramic, other materials, and combinations of these materials. Housing 12 or parts of housing 12 may be formed using a unibody construction in which housing structures are formed from an integrated piece of material. Multipart housing constructions may also be used in which housing 12 or parts of housing 12 are formed from frame structures, housing walls, and other components that are attached to each other using fasteners, adhesive, and other attachment mechanisms.

Device 10 may have a display such as display 14 mounted in housing 12. Display 14 may be formed using any suitable display technology. For example, display 14 may be liquid crystal display (LCD), a plasma display, an organic light-emitting diode (OLED) display, an electrophoretic display, a microelectromechanical systems (MEMs) shutter display, or a display implemented using other display technologies.

A touch sensor and a force sensor may be incorporated into display 14. Touch sensors for display 14 may be resistive touch sensors, capacitive touch sensors, acoustic touch sensors, light-based touch sensors, force-based touch sensors, or touch sensors implemented using other touch technologies. As an example, device 10 may include a capacitive touch sensor with an array of capacitive touch sensor electrodes that allows measurement of the position of an external objected such as finger 20. The touch sensor may determine where an external object such as a user's finger (e.g., finger 20) is contacting the surface of device 10 and display 14 (i.e., the touch sensor may measure the location at which an external finger contacts the surface of display 14 in lateral dimensions 18). Display 14 lies within the X-Y plane of FIG. 1, so the touch sensor output from the touch sensor of display 14 produces information on the position of the user's finger (or other external object) in lateral dimensions X and Y.

When an external object such as finger 20 presses downwards on display 14 (or other external surface of device 10) in direction 22, force is imparted on the surface of display 14 (or other device structure). Display 14 may include force sensor structures that detect force on display 14 in direction 22 (i.e., in the −Z direction of FIG. 1). With one suitable arrangement, display 14 includes an outer transparent layer (sometimes referred to as a display cover layer). The display cover layer may be formed from a material such as glass, plastic, sapphire, or other transparent material. The display cover layer is clear, so that display 14 may display images for a user using an array of pixels overlapped by the display cover layer. The display cover layer or other planar member in device 10 (e.g., a trackpad member) may deform out of the X-Y plane when force is exerted in direction 22.

A force sensor may be implemented using capacitive sensor electrodes within device 10. The force sensor may be formed on the underside of display 14 or may be formed on layers of material that are separated from display 14 by an air gap.

Capacitances associated with the electrodes in the force sensor may vary as a function of separation between the electrodes, which can be influenced by the amount of force applied to the force sensor by pressing on display 14 or other structures in device 10. Force measurements may therefore be gathered by making capacitance measurements between appropriate capacitor electrodes. If desired, these capacitance measurements may also be processed to determine the position at which a force is being applied to device 10 (i.e., to covert force data into touch location data). In this way, force data may be used to implement a touch sensor.

Illustrative configurations for the force and touch sensing structures of device 10 may sometimes be described herein in the context of touch and force sensors integrated into display 14. This is, however, merely illustrative. Touch and/or force sensors may be incorporated into other portions of device 10 (e.g., portions of device 10 that do not include display structures), if desired.

Figure 2:
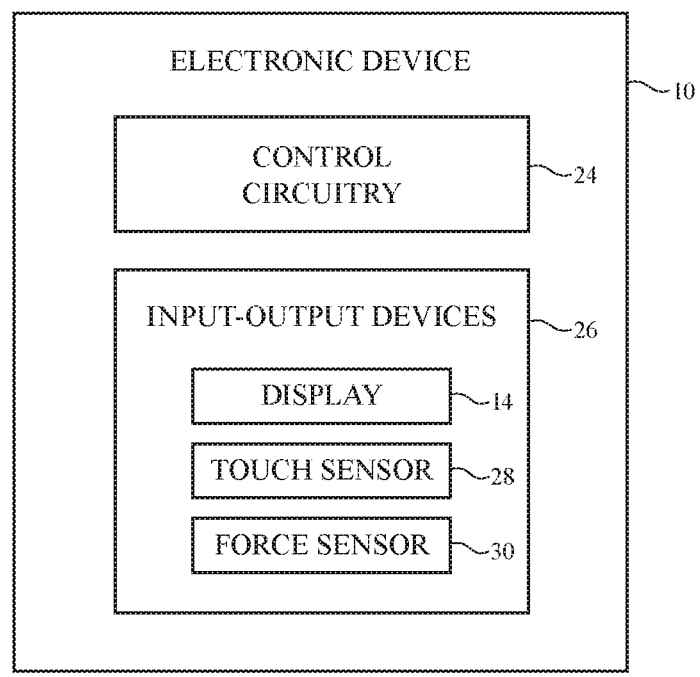
FIG. 2 is a schematic diagram of an illustrative electronic device in accordance with an embodiment.

A schematic diagram of an illustrative electronic device such as device 10 of FIG. 1 is shown in FIG. 2. As shown in FIG. 2, electronic device 10 may have control circuitry 24. Control circuitry 24 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 24 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 26 may be used to allow data to be supplied to device 10 and to allow data to be provided from device 10 to external devices. Input-output devices 26 may include buttons, joysticks, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 26 and may receive status information and other output from device 10 using the output resources of input-output devices 26. Input-output devices 26 may include one or more displays such as displays 14.

Control circuitry 24 may be used to run software on device 10 such as operating system code and applications. During operation of device 10, the software running on control circuitry 24 may display images on display 14 (e.g., video, still images such as text, alphanumeric labels, photographs, icons, other graphics, etc.) using arrays of pixels in display 14.

Display 14 may have a rectangular shape or other suitable shape. For example, display 14 may have a rectangular footprint and a rectangular peripheral edge that runs around the rectangular footprint. Display 14 may be planar or may have a curved profile.

Touch sensor 28 may be implemented using an array of capacitive electrodes (e.g., electrodes that extend across the surface of device 10 in dimensions X and Y. The touch sensor may be formed as part of a track pad or other structure that is independent from display 14 or may be incorporated into one of the layers of display 14. In configurations in which touch sensor 28 is incorporated into the structures of display 14, capacitive touch sensor electrodes for sensor 28 may be formed from a transparent material such as indium tin oxide.

Force sensor 30 may be implemented in an opaque structure such as a track pad in display 14 and/or may be implemented as part of display 14. Force sensor 30 may be formed from capacitive electrodes that produce a capacitance output that is indicative of applied force or may be implemented using other force sensor technologies. If desired, some of the capacitive electrodes that are used in forming force sensor 30 may be shared with some of the capacitive electrodes that are used in forming touch sensor 28. Configurations in which the sensor electrodes for measuring touch sensor input and force sensor input are separate may also be used.

In some configurations, force sensor signals from an array of force sensor electrodes may be processed provide information on the location at which finger 20 is applying force, thereby allowing force sensor 30 to serve as a touch sensor (in addition to serving as a force sensor that produces force output data proportional to the amount of force applied by finger 20 in inward direction 22).

Configurations in which touch sensor 28 and force sensor 30 are implemented using transparent capacitive touch sensor electrodes that overlap display 14 are sometimes described here as an example. Other touch sensor and force sensor arrangements may be used in device 10, if desired.

Figure 3:
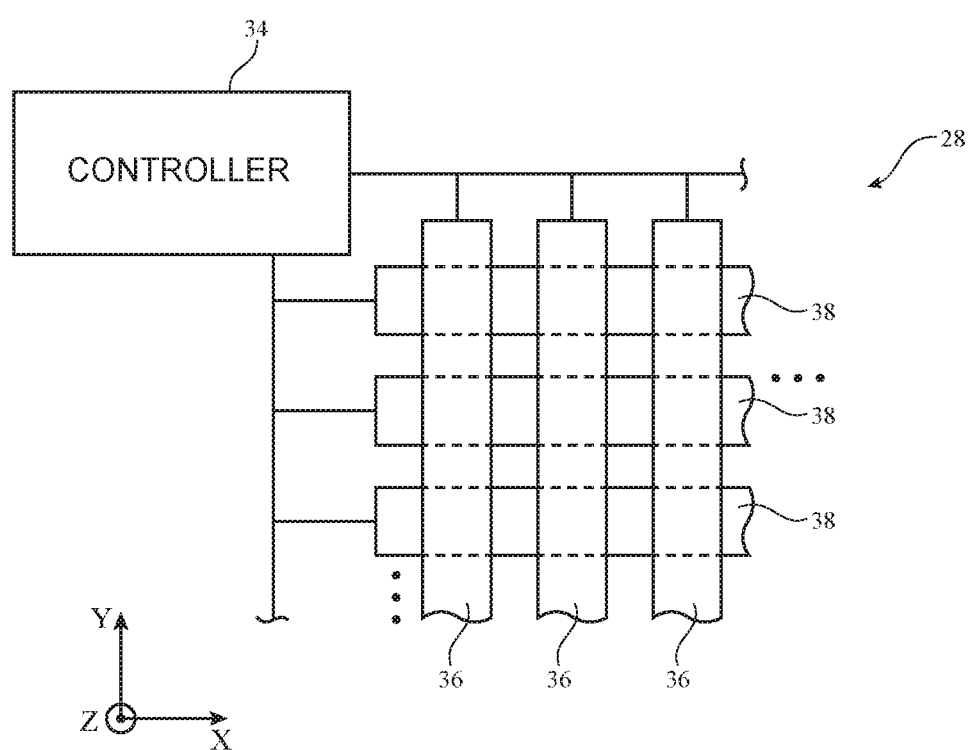
FIG. 3 is a top view of an illustrative touch sensor in accordance with an embodiment.

FIG. 3 is a top view of an illustrative capacitive touch sensor. As shown in FIG. 3, touch sensor 28 may have overlapping electrodes such as electrodes 36 and electrodes 38. Electrodes 36 and 38 may be coupled to touch sensor circuitry such as touch sensor controller 34. Controller 34 may apply drive signals to electrodes 36 while gathering corresponding sense signals from electrodes 38. In the presence of an external object such as finger 20 at an intersection between a particular one of electrodes 36 and a particular one of electrodes 38, the capacitance sensed between the intersecting electrodes will change. By processing the drive and sense signals, controller 34 can monitor the capacitances between each of the intersecting electrodes in sensor 38 and thereby determine whether or not those electrodes are being touched by finger 20. This allows the position of finger 20 to be determined by controller 34.

Figure 4:
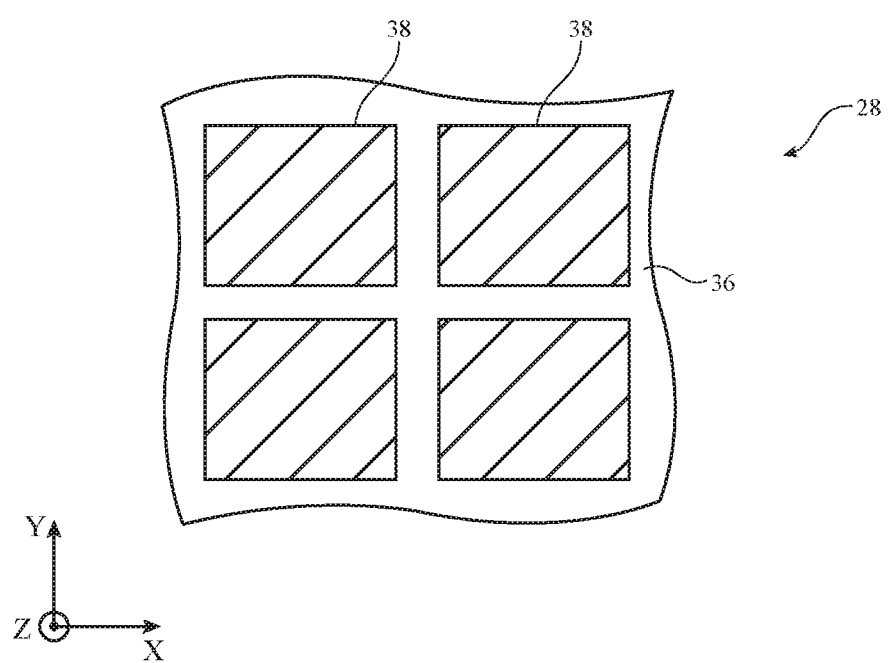
FIG. 4 is a top view of an illustrative touch sensor electrode pattern in accordance with an embodiment.

In the example of FIG. 3, electrodes 36 and 38 have the shape of elongated strips of conductive material (e.g., indium tin oxide, etc.). Other electrode shapes may be used if desired (e.g., blanket films, patterns of diamond-shaped or rectangular electrodes, etc.). In the illustrative electrode pattern of FIG. 4, electrode 36 is a blanket conductive layer (e.g., an electrode that overlaps all of display 14) and electrodes 38 are patterned to from an array of rectangular pads. Other electrode patterns may be used, if desired. The illustrative capacitive touch sensor electrode patterns of FIGS. 3 and 4 are merely examples.

Figure 5:
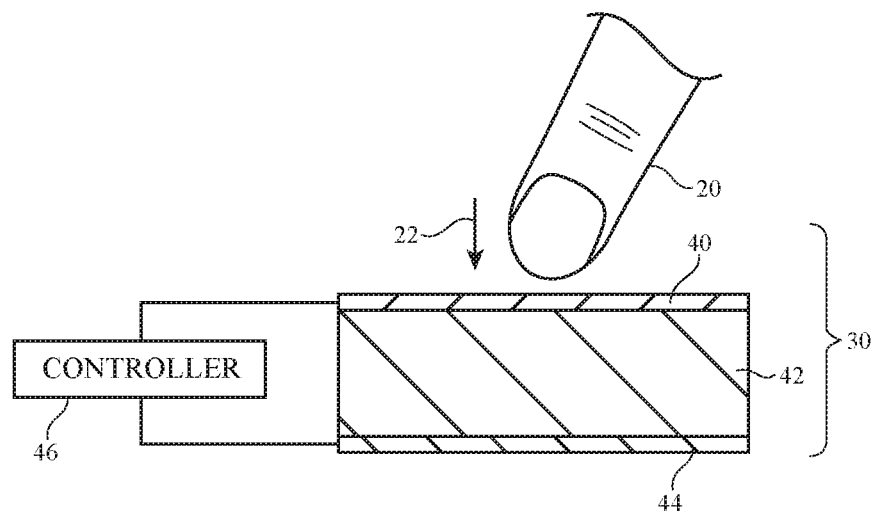
FIG. 5 is a cross-sectional side view of an illustrative force sensor in a configuration in which a user's finger has not contacted the sensor in accordance with an embodiment.
Figure 6:
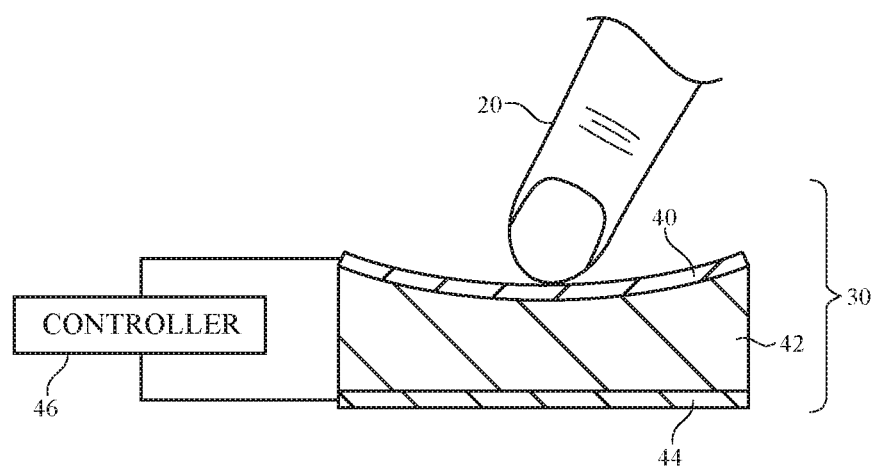
FIG. 6 is a cross-sectional side view of the illustrative force sensor of FIG. 5 following depression of the surface of the force sensor with the user's finger in accordance with an embodiment.

FIGS. 5 and 6 show how force sensor 30 may use a capacitive sensor arrangement. In the example of FIG. 5, sensor 30 has upper (outer) force sensor capacitive electrode 40 and lower (inner) force sensor capacitive electrode 44. Dielectric material 42 (e.g., an elastomeric polymer or other deformable layer) may be interposed between electrodes 40 and 44. Controller 46 may measure the capacitance between electrodes 40 and 44. Capacitance is at a minimum when the separation between electrodes 40 and 44 is a maximum, as shown in FIG. 5. After a user has pressed finger 20 inwards in direction 22 as shown in FIG. 6, upper electrode 40 deforms towards electrode 44, thereby increasing the amount of capacitance measured by controller 46. With this type of arrangement, the capacitance output of sensor 30 is proportion to force. Capacitance is low when applied force is low and is high when applied force is high.

Figure 7:
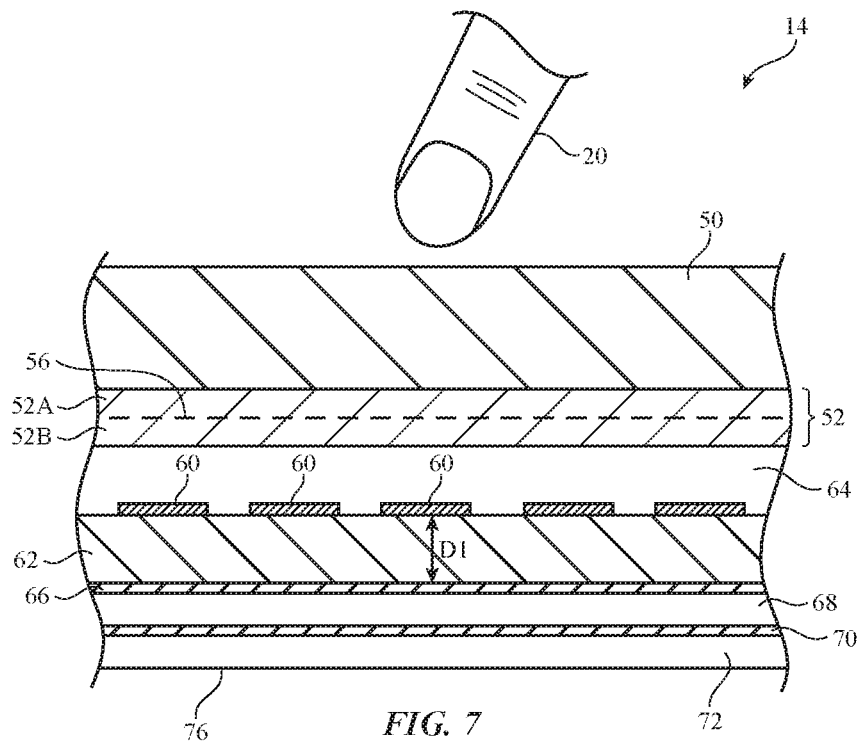
FIG. 7 is a cross-sectional side view of an illustrative device with a force sensor that is not being contacted by an external object such as a user's finger in accordance with an embodiment.

It may be desirable to form a touch sensor such as touch sensor 28 and a force sensor such as force sensor 30 from structures in display 14. Consider, as an example, the cross-sectional side view of the portion of device 10 that is shown in FIG. 7. As shown in FIG. 7, display 14 may include an outer layer such as display cover layer 50. Display structures 52 may be attached to the lower surface of display cover layer 50. Display structures 52 may include, for example, an organic light-emitting diode layer, a liquid crystal display layer, and/or other types of display structures for producing images for a user. A touch sensor may be formed within layers 52 or may be formed elsewhere in device 10. With one illustrative configuration, display structures 52 include liquid crystal display layers (module) 52A and backlight unit 52B.

Module 52A may have upper (outer) and lower (inner polarizers) and interposed layers such as a color filter layer, liquid crystal layer, and thin-film transistor layer. Capacitor electrode 56 may be located on the inner surface of the inner polarizer layer and may overlap display 14.

Backlight unit 52B may be located below electrode 56. Backlight unit 52B may be formed from a light guide layer that receives light from edge-mounted light-emitting diodes. The light guide layer distributes the light laterally throughout display 14. Light that is scattered outwards through module 52A may serve as backlight illumination for display 14. Light that is scattered inwards may be reflected upwards by a reflector located on the bottom surface of backlight unit 52B.

Capacitive electrodes 60 may be formed in an array (e.g., a two-dimensional array) that covers display 14. Elastomeric layer 62 may support electrodes 60. An air gap such as air gap 64 may lie between electrodes 60 and backlight unit 52B. Elastomeric layer 62 may separate lower capacitive electrode 66 from electrodes 60 by a distance D1 when finger 20 is not pressing inwardly on display cover layer 50. Dielectric layers 68 (e.g., polymer layer(s)) may separate ground layer 70 from lower electrode 66. Additional structures such as structures 72 may serve as support structures for the layers of material mounted above structures 72. Structures 72 may include, for example, pressure sensitive adhesive, battery structures, housing structures, etc.

During operation of the force sensor, control circuitry such as circuitry 46 of FIGS. 5 and 6 may measure capacitances using the capacitive electrodes of device 10. As an example, force sensor circuitry such as circuitry 46 may monitor capacitances between electrodes 60 on the upper surface of deformable elastomeric layer 62 and electrode 66 on the lower surface of deformable elastomeric layer 62.

Figure 8:
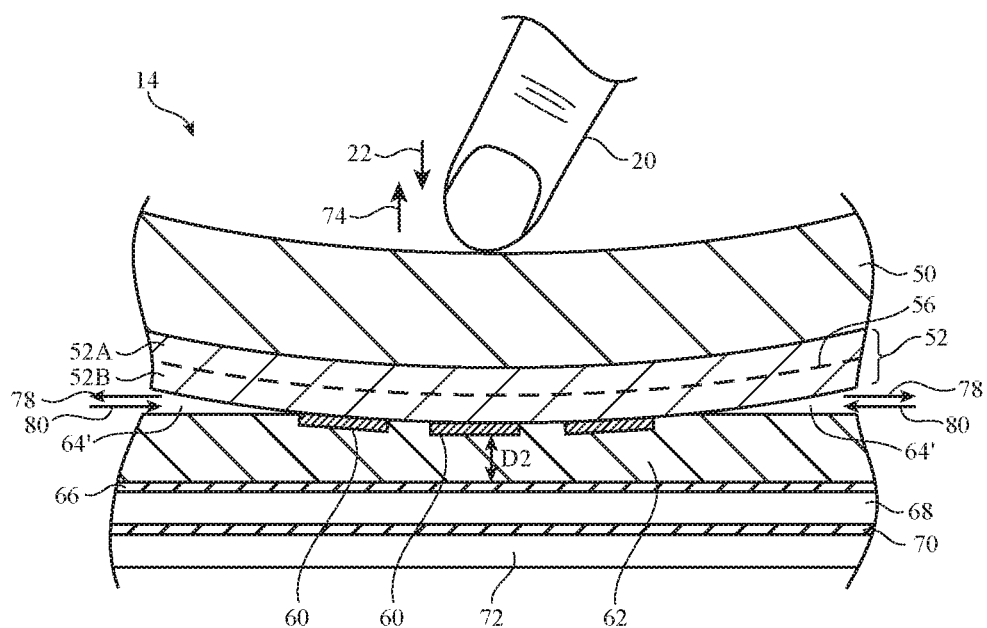
FIG. 8 is a cross-sectional side view of the illustrative device of FIG. 7 following application of pressure on the force sensor with the finger of the user or other external object in accordance with an embodiment.

When finger 20 presses downward in direction 22, display cover layer 50 may deform inwardly so that backlight unit 52B and other display structures 52 press against the upper surface of elastomeric layer 62 and thereby deform elastomeric layer 62 inwardly, as shown in FIG. 8. This reduces the distance separating electrodes 60 from lower electrode 66 from D1 in FIG. 7 to a value D2 that is less than D1 in FIG. 8. As the separation between electrodes 60 and electrode 66 decreases, controller 46 may measure correspondingly increased capacitance(s) between each displaced electrode 60 and electrode 66, thereby producing an output that is proportional to force. The output can be obtained independently for each deflected electrode 60 or the maximum output of electrodes 60 or other collective output signal may be gathered. In configurations in which a force signal is gathered from each electrode 60 force data may be converted to position information (e.g., the force sensor structures may be used in producing position data that can complement or replace the position data produced using touch sensor 28). If desired, controller 46 may measure other capacitance values (e.g., the capacitance between upper electrode 56 and electrodes 60 may be measured, which is also indicative of applied force levels).

Touch sensor structures for display 14 may be formed from an array of touch sensor electrodes in display structures 52 (e.g., electrodes in display module 52A), from an array of touch sensor electrodes interposed between display module 52A and the inner surface of display cover layer 50, or other capacitive touch sensor electrodes that are separate from the force sensor electrodes and/or force sensor electrodes such as electrode 56, electrodes 60, and/or electrode 66 may be used in forming a capacitive touch sensor.

As shown in FIG. 8, the lower portion of display 14 (i.e., inner surface 76 of backlight unit 52B) may press inwardly against layer 62 and electrodes 60 when finger 20 presses inwards in direction 22 and deforms (i.e., bends) display 14. This forces the air from air gap 64 to move outwards from under display 14 in directions 78. When finger 20 is released from display cover layer 50 in direction 74, the depressed portion of display cover layer 50 will move in direction 74 to return to its original shape (e.g., a planar shape). Display cover layer 50 will move in direction 74 to relieve the stress that was imparted to layer 50 when layer 50 was bent due to the pressure of finger 20 in direction 22. Elastomeric layer 62 may also exert a restoring force on display layer 50 in direction 74 and will restore electrodes 60 to their initial position. The spring-back force imparted in direction 74 by display cover layer 50 will pull the lower surface of display 14 (e.g., backlight 52B) away from electrodes 60 and layer 62. As a result, the air that was displaced from under display cover layer 50 to air gap regions 64' will be drawn back under display cover layer 50 in directions 80.

The air flow in directions 80 that is created by the release of finger 20 from display cover layer 50 is impeded by the small separation between the lower surface of display 14 (e.g., the lower surface of backlight 52B) and the upper surface of the adjacent portions of the structures of FIG. 8 such as electrodes 60 and elastomeric layer 62. Particularly in configurations in which these two mating surfaces are smooth, there is a risk that the gap size (the height of adjacent air gap portions 64' and the air gap directly under the primary deformed portion of display cover layer 50) will be so small that air cannot readily return to fill air gap 64. This blocks airflow and slows down the process of returning display 14 and air gap 64 to their normal states.

In addition to slowing movement of the bent display layers of display 14, stiction arising from the small air gap can produce force sensor hysteresis. In particular, upward movement of display 14 as display 14 is springing back to its original position may create suction that momentarily pulls upon layer 62 and electrodes 60. This upward pull on layer 62 tends to separate electrodes 60 from electrode 66, thereby creating an overshoot condition characterized by an overly small output capacitance measured across electrodes 66 and 60. One of the consequences of inadequate airflow in regions 64' (and/or stickiness of the bent display layers with respect to layer 62) is therefore an overshoot in the force signal.

To minimize or eliminate force sensor signal overshoot, air flow promotion structures may be formed on electrodes 60 and the upper surface of layer 62. By promoting air flow and reducing sticking between layer 62 and the lower surface of display 14, display cover layer 50 may return upwards to its planar configuration rapidly after finger 20 is removed. The air flow promotion structures may be reduce or eliminate upwards suction on electrodes 60 during this process. The air flow promotion structures may include rectangular spacers (sometimes referred to as shims, pads, or spacer pads) that prevent uninterrupted intimate contact between large smooth portions of display 14 and layer 62 when display 14 is bent inwardly to compress layer 62. Anti-stick coatings, textures, and other features may be incorporated into the air flow promotion structures to enhance performance.

Figure 9:
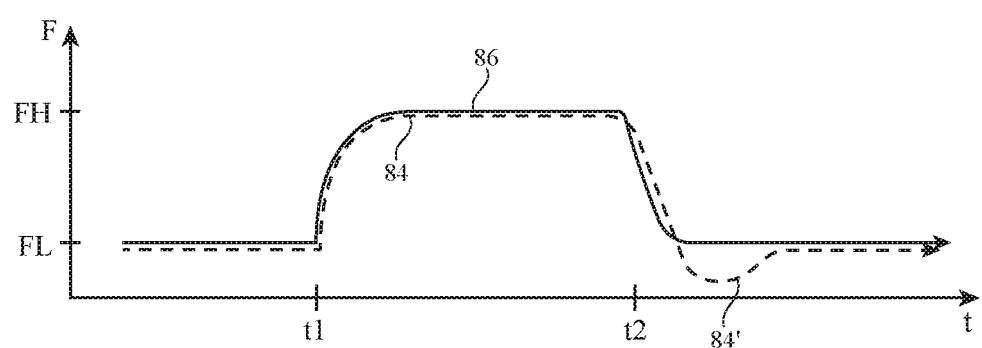
FIG. 9 is a graph showing how an output signal from a force sensor may be affected by the presence of air-flow promotion structures and other structures that promote the release of adjacent layers within a force sensor in accordance with an embodiment.

The impact of incorporating air flow promotion structures between electrodes 60 and the lower surface of display 14 is illustrated in the graph of FIG. 9. In the graph of FIG. 9, force sensor output F (e.g., the capacitance between one or more of electrodes 60 and electrode 66) has been plotted as a function of time for two different illustrative force sensor configurations. Dashed line 84 corresponds to a force sensor configuration of the type shown in FIG. 8 without any air flow promotion structures interposed between display 14 and electrodes 60. Solid line 86 corresponds to a force sensor configuration in which air flow promotion structures have been incorporated onto the lower surface of display 14 and/or the opposing upper surface of electrodes 60 and layer 62.

At time t1, a user of device 10 presses inwards in direction 22. This causes display 14 to bridge air gap 64 and press electrodes 60 inwardly towards electrode 66. The output of the force sensor (i.e., the capacitance between electrode(s) 60 and electrode 66 therefore increases from low level FL to high level FH. The magnitude of force sensor output signal (capacitance) FH is proportional to the force exerted on display 14 (i.e., FH is inversely proportional to the distance separating electrodes 60 from electrode 66).

At time t1, the user releases finger 20 and display 14 springs upwards in direction 74. Air flows under the released portion of display 14 in directions 80. In the presence of air flow promotion structures, display 14 quickly returns to its normal planar state (or other resting state) and force signal F (i.e., the capacitance between electrodes 60 and electrode 66) drops quickly to low level FL, as illustrated by solid line 86 of FIG. 9. In the absence of air flow promotion structures, in contrast, the narrow size of gap 64' and the smooth and intimate contact between display 14 and electrodes 60 slows air flow and creates upwards suction on electrodes 60 and surface stickiness, momentarily pulling electrodes 60 away from electrode 66 and creating an abnormally low force output signal F (see, e.g., overshoot 84' in line 84 of FIG. 9).

Figure 10:
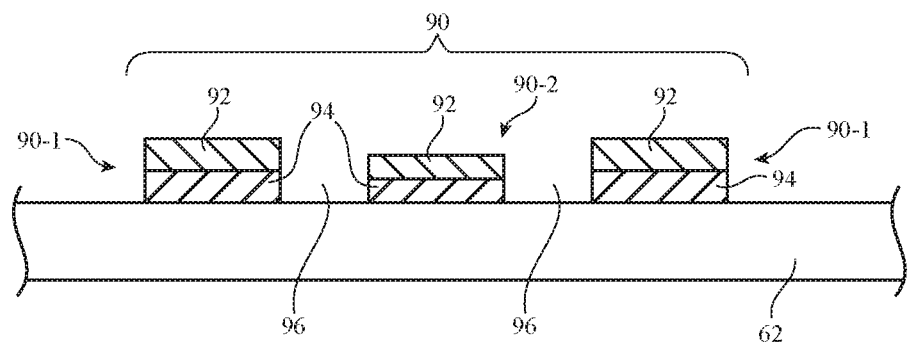
FIGS. 10 and 11 are cross-sectional side views of illustrative air flow promotion structures to promote air flow within a force sensor and thereby enhance force sensor responsiveness in accordance with an embodiment.

Illustrative air flow promotion structures are shown in FIG. 10. In the example of FIG. 10, air flow promotion structures 90 have been formed on lower layer 62 (e.g., an elastomeric support for electrodes 60, which are not shown in FIG. 10). If desired, air flow promotion structures 90 may be formed on the opposing lower surface of backlight unit 52B or air flow promotion structures 90 may be formed on both of the opposing surfaces facing air gap 64 (i.e., the lower surface of backlight unit 52B and the opposing upper surface of electrode support structures such as layer 62). Configurations in which air flow promotion structures 90 are formed on layer 62 are sometimes described herein as an example.

In the illustrative configuration of FIG. 10, air flow promotion structures 90 include an array of pads (sometimes referred to as spacers, spacer pads, or shims) separated by interposed air flow channels 96. The spacer pads may all have the same height, may have three or more different heights, or, as shown in FIG. 10 structures 90 may include pads of two different heights (i.e., two different thicknesses) such as tall pads 90-1 and short pads 90-2. Configurations with multiple different heights may help promote quick release of the lower surface of display 14 from layer 62 and satisfactory air flow.

Pads 90-1 and 90-2 may be formed from layers of polymer or other materials (layers 92) that have been attached to layer 62 using adhesive 94. In this type of arrangement, pads 90-1 and 90-2 may be attached to layer 62 from a tape (as an example). If desired, pads such as pads 90-1 and 90-2 (or other spacer structures that promote air flow) may be deposited using screen printing, blanket deposition of a layer or layers of material followed by photolithographic patterning (e.g., a layer of photoimageable polymer exposed and developed to form a desired pad pattern), blanket deposition followed by etching, shadow-mask deposition, electroplating, or other techniques for forming pads 90-1 and 90-2 from a single material or layers of material. Configurations for air flow promotion structures 90 that are formed from three or more different materials (e.g., an adhesive layer, a stiff polymer shim pad layer, and a non-stick coating) may also be used.

Figure 11:
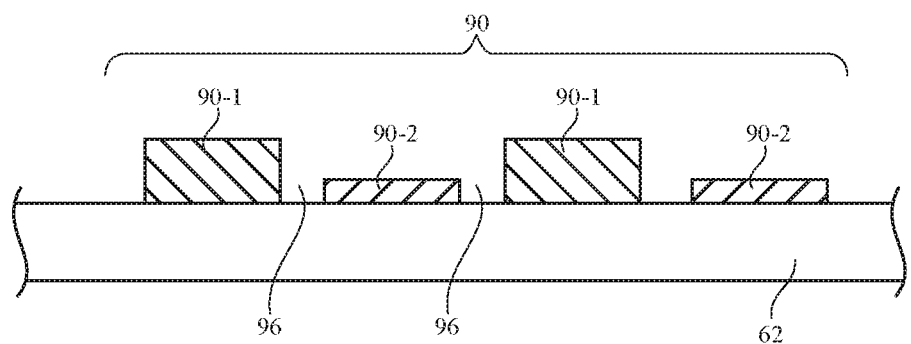
Figure 12:
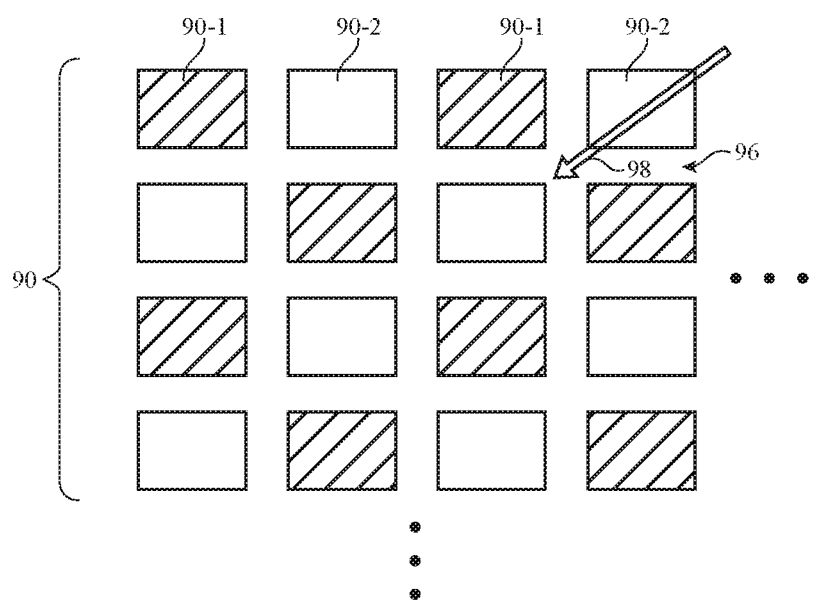
FIGS. 12-17 are top views of illustrative spacer pad patterns of the type that may be used in air flow promotion structures in an electronic device with a force sensor in accordance with an embodiment.

Air flow promotion structure pads 90-1 and 90-2 may be organized in a rectangular array having rows and columns or may be arranged in other patterns. A top view of air flow promotion structures 90 of FIGS. 10 and 11 is shown in FIG. 12. As shown in FIG. 12, air flow promotion structures 90 may include pads 90-1 and 90-2. The heights of pads 90-1 and 90-2 causes pads 90-1 and 90-2 to protrude upwards away from layer 62 and prevents the lower surface of backlight unit 52B from contacting layer 62. When display cover layer 50 is released and is springing back towards its planar configuration, air may flow through structures 90 in air flow channels such as channels 96 of FIG. 12 and over the pads (particularly shorter pads 90-2, as illustrated by arrow 98 of FIG. 12). Because of the uneven surface formed by air flow promotion structures 90 (and the reduced amount of area where the display layers and layer 62 contact each other), display cover layer 50 and layer 62 will be able to pull apart from each other without excessive resistance (i.e., air will be able to flow quickly in directions 80, thereby avoiding overshoot in force output signal F).

Figure 13:
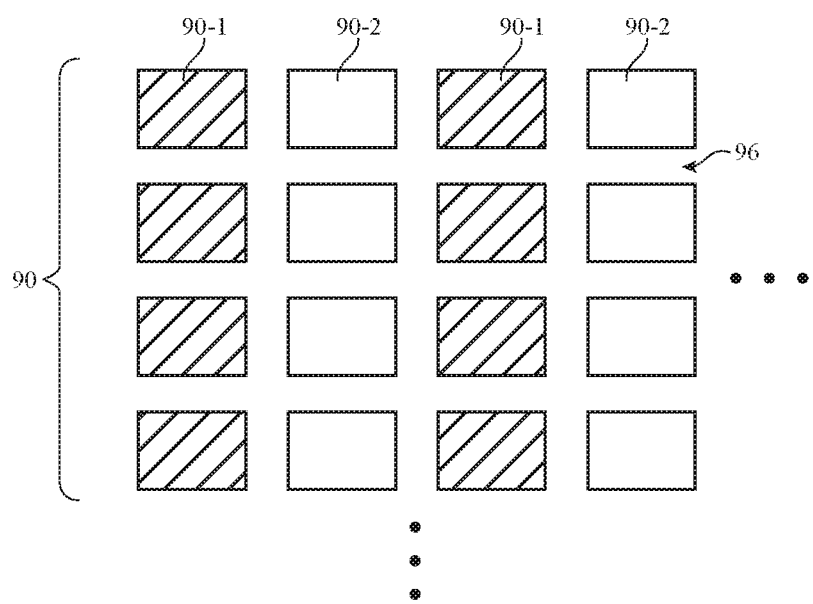
Figure 14:
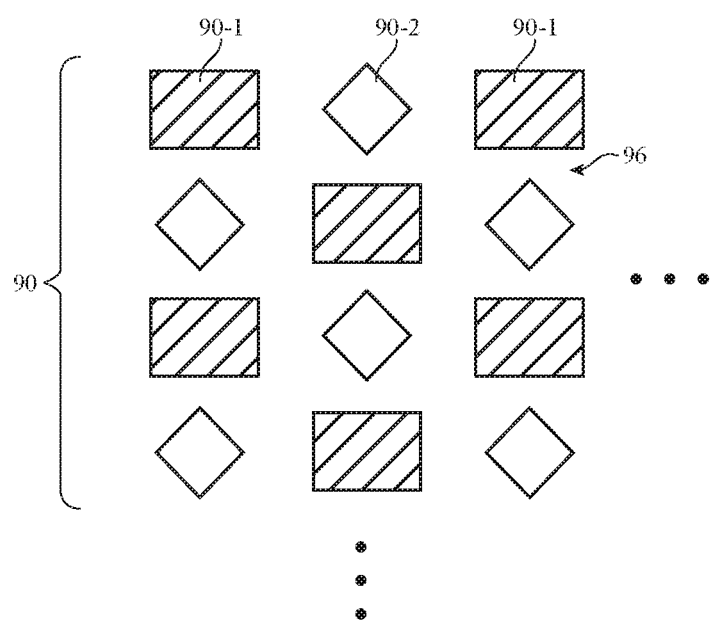
Figure 15:
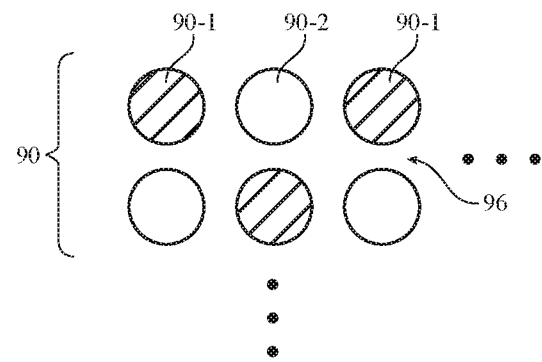
Figure 16:
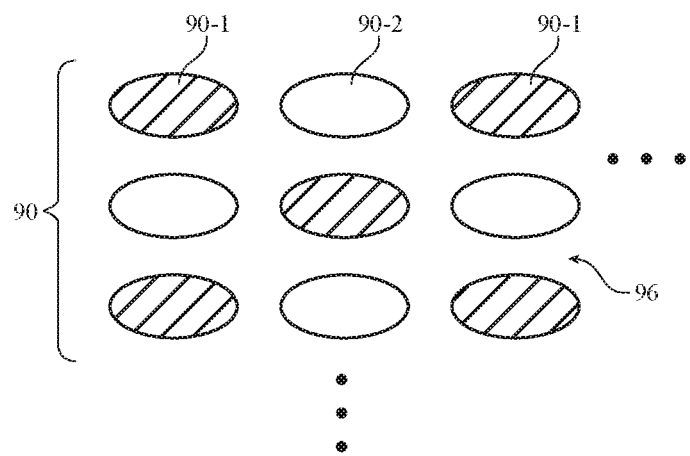
Figure 17:
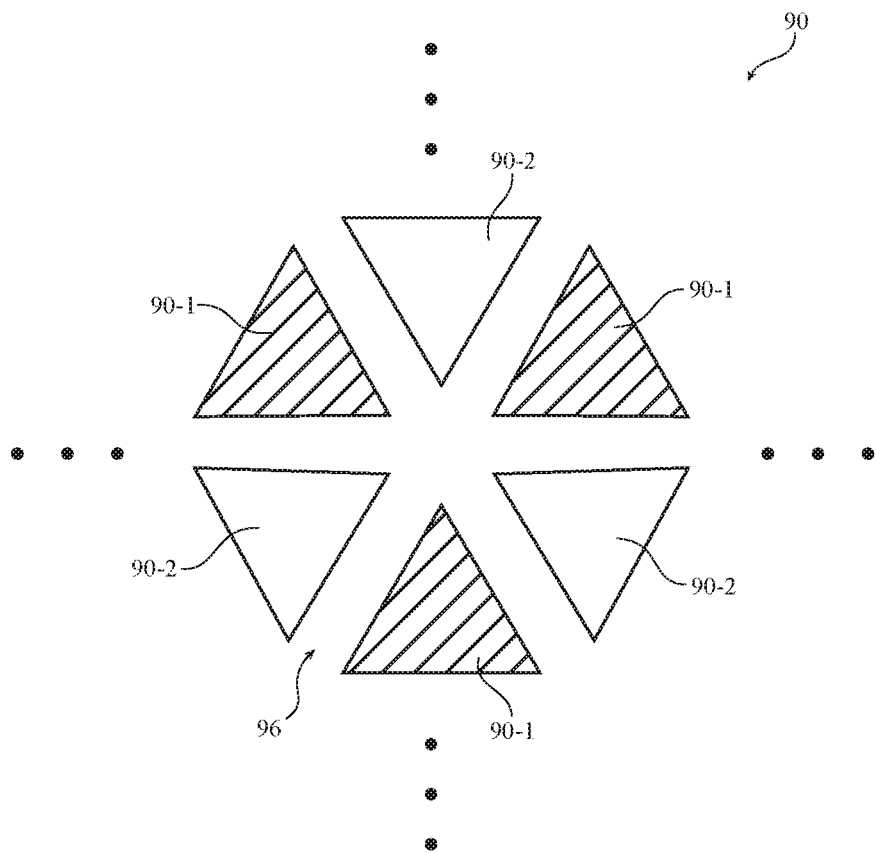

In the illustrative arrangement of FIG. 12, tall spacer pads 90-1 and short spacer pads 90-2 are arranged in a checkerboard pattern (alternating across both rows and columns of the array of pads). FIG. 13 shows how pads 90-1 and pads 90-2 may be arranged in alternating columns. In the configuration of FIG. 14, pads 90-1 and pads 90-2 are arranged in a checkerboard pattern and have different shapes. Pads 90-1 are rectangular. Pads 90-2 are diamond shaped. In the illustrative checkerboard pattern of FIG. 15, pads 90-1 and pads 90-2 are circular. FIG. 16 shows how pads 90-1 and 90-2 may be elliptical. In the example of FIG. 17, pads 90-1 and 90-2 are triangular. The shape of the channels 96 surrounding each cluster of six pads 90-1 and 90-2 of the type shown in FIG. 17 is hexagonal. In general, the pads of air flow promotion structures 90 may be triangular, rectangular, circular, elliptical, square, hexagonal, may have shapes with curved sides, shapes with straight sides, and shapes with combinations of straight and curved sides, may form grooves, may form recesses, may form arrays and have other regular patterns, may be arranged in pseudorandom patterns, or may have other suitable configurations. The configurations of FIGS. 10-17 are merely illustrative.

Figure 18:
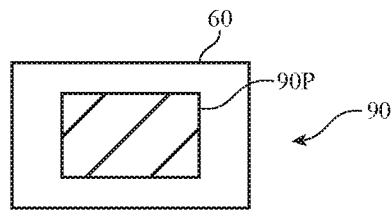
FIGS. 18-21 are top views of illustrative air flow promotion structures showing possible relationships between the size of spacer pads in the air flow promotion structures and electrodes on a deformable layer in a force sensor in accordance with an embodiment.
Figure 19:
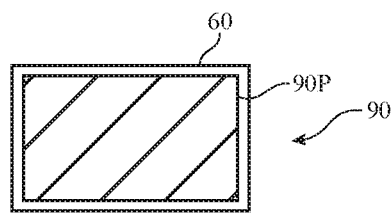
Figure 20:
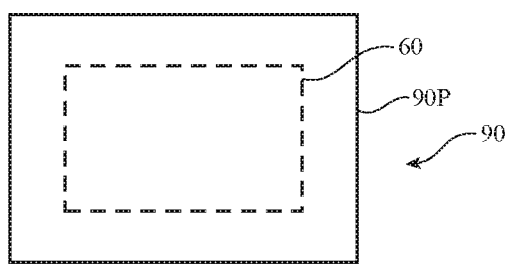
Figure 21:
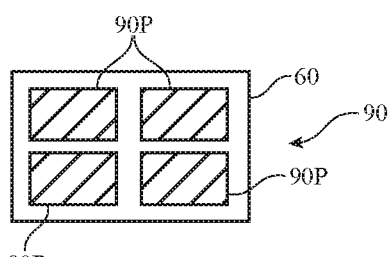

As shown in FIG. 18, air flow promotion pads 90P in air flow promotion structures 90 may be smaller than electrodes 60 and may be overlapped by electrodes 60. Electrodes 60 may be formed from an array of rectangular pads (e.g., metal pads) or other suitable electrode structures. In the example of FIG. 19, air flow promotion structure pad 90P has the same rectangular shape and same size as electrode 60. FIG. 20 shows how air flow promotion structure pad 90P may be larger than electrode 60. In the FIG. 21 example, there are four pads 90P on a single corresponding electrode 60. Configurations in which pads 90P partly overlap electrodes 60 and/or are spaced unevenly with respect to electrodes 60 may also be used.

Figure 22:
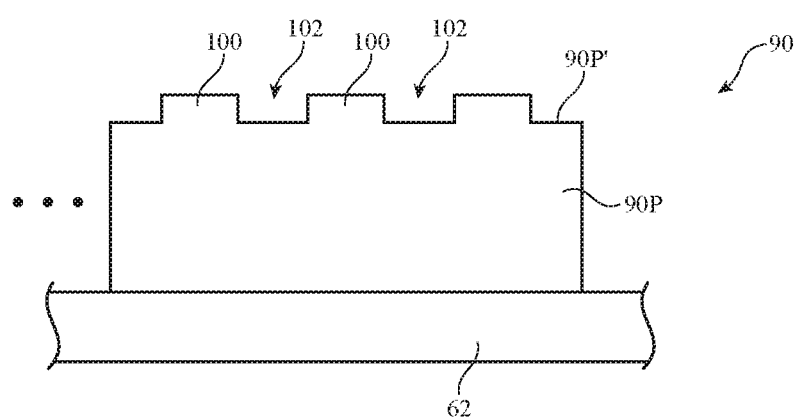
FIG. 22 is a cross-sectional side view of an illustrative spacer pad in a configuration in which the surface of the spacer pad has been provided with a texture to minimize sticking to adjacent layers in accordance with an embodiment.

It may be desirable to texture pads 90P, as shown in FIG. 22. In the example of FIG. 22, upper surface 90P' of spacer pad 90P has been provided with protruding portions 100 that are separated by recessed portions 102. The surface texture associated with upper surface 90P' may help prevent sticking between the lower surface of display 14 and the upper surface of the air flow promotion structures on layer 62 and may therefore be referred to as an anti-stick surface, anti-stick structures, or anti-stick texture.

Figure 23:
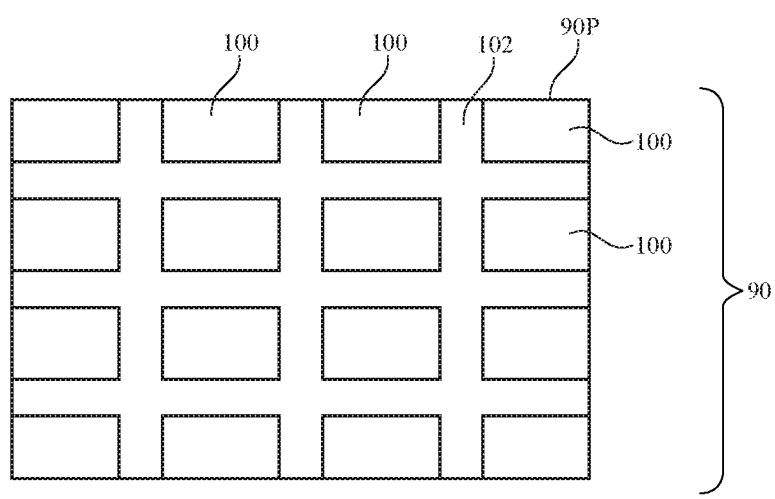
FIG. 23 is a top view of an illustrative spacer pad with textured anti-stick structures to prevent sticking in accordance with an embodiment.
Figure 24:
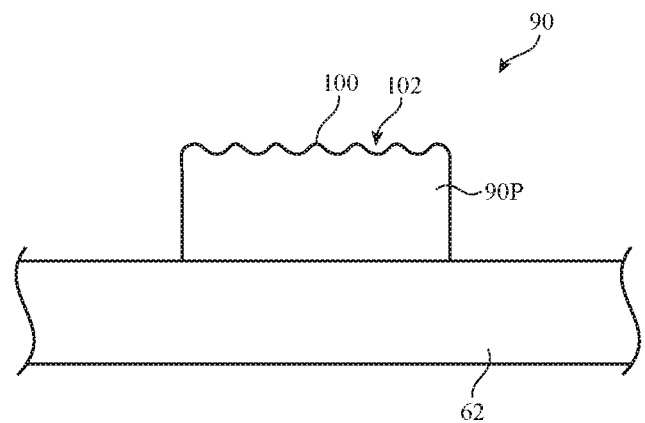
FIG. 24 shows how a spacer pad may have an undulating surface texture to prevent sticking in accordance with an embodiment.

FIG. 23 is a top view of the illustrative anti-stick structures of FIG. 22 showing how protrusions 100 may have rectangular shapes and may be arranged in an array with rows and columns. Other configurations may be used for protrusions 100 (e.g., triangular shapes, rectangular shapes, protrusions with different heights, circular shapes, elliptical shapes, shapes with straight edges, curved edges, or combinations of strait and curved edges, shapes in pseudorandom patterns, etc.). The cross-sectional side view of FIG. 24 shows how protrusions 100 may have a wavy profile. Protrusions 100 may be formed using embossing, etching, molding, photolithography, or other techniques.

Figure 25:
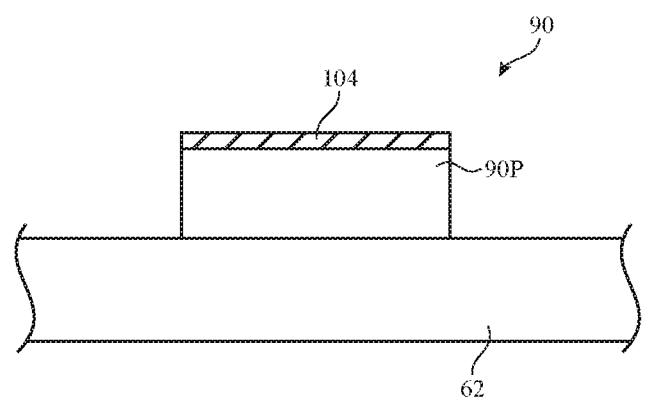
FIG. 25 is a cross-sectional side view of an illustrative spacer pad with an anti-stick surface coating to help prevent sticking in accordance with an embodiment.

A non-stick coating layer such as a layer of polytetrafluoroethylene or other non-stick coating may be formed on the upper surface of a textured or smooth spacer pad, as shown by illustrative non-stick coating 104 on pad 90P of air flow promotion structures 90 of FIG. 25.

To prevent air flow promotion structures 90 from deforming excessively and thereby tending to stick when contacted by display cover layer 50 or other surfaces, it may be desirable to form air flow promotion structures 90 (e.g., spacer pads, etc.) from stiff materials (e.g., materials such as plastic, metal, glass, ceramic, or other materials having an elastic modulus of 0.5 GPa or more, 1 GPa or more, 1-100 GPa, more than 2 GPa, less than 200 GPa, or other suitable value). When air flow prevention structures 90 are formed from stiff materials such as these, downwards force from display cover layer 50 may be transferred to deformable elastomeric layer 62, so that electrodes 60 and layer 62 are deformed downwards without expending downwards force from finger 20 compressing the material of structures 90. Stiff air flow prevention structures are therefore able to efficiently transfer force from finger 20 to electrodes 60.

The height of air flow prevention structures 90 (e.g., the heights of tall and short spacer pads) may be about 20-50 microns, more than 5 microns, more than 10 microns, more than 20 microns, 10-150 microns, less than 200 microns, more than 30 microns, less than 75 microns, or other suitable height. This helps allow sufficient air to flow without creating excess thickness in the layers of device 10.

The ratio of the area consumed by the spacer pads to the air flow channels surrounding the spacer pads may be 1:1, 1-100 to 1, more than 1 to 1, more than 2 to 1, more than 100 to 1, less than 100 to 1, less than 2 to 1, less than 1 to 1, 1 to 1-100, 1 to 2-20, 1 to more than 1, 1 to more than 1, 1 to more than 100, or 1 to less than 50 (as examples). When relatively more area is consumed by spacer pads, force transfer is enhanced, but air flow can become restricted. When relatively more area is consumed by air flow channels, air flow is enhanced, but excessively small spacer pad areas should be avoided to ensure that there is sufficient contact area to deflect electrodes 60 satisfactorily.

The surface characteristics of the spacer pads in air flow promotion structures 90 can be selected to reduce sticking and thereby help avoid sensor overshoot. Stickiness can be reduced by creating a texture on the upper surface of the spacer pads and/or by applying a non-stick coating to the spacer pads. Textured surfaces are illustrated in the examples of FIGS. 22-24. A non-stick coating is illustrated by coating 104 of FIG. 25. Non-stick coatings for structure 90 may by hydrophobic. Examples of non-stick (hydrophobic) coating materials for structures 90 include polytetrafluoroethylene and fluorinated ethylene propylene. Hydrophobic coating materials for use in coating air flow promotion structures 90 may be characterized by relatively large contact angles A (e.g., contact angle A may be greater than 90°, contact angle A may be greater than 130°, or contact angle A may be greater than 170°). Non-stick coatings may be formed on spacer pads with smooth or textured surfaces.

Figure 26:
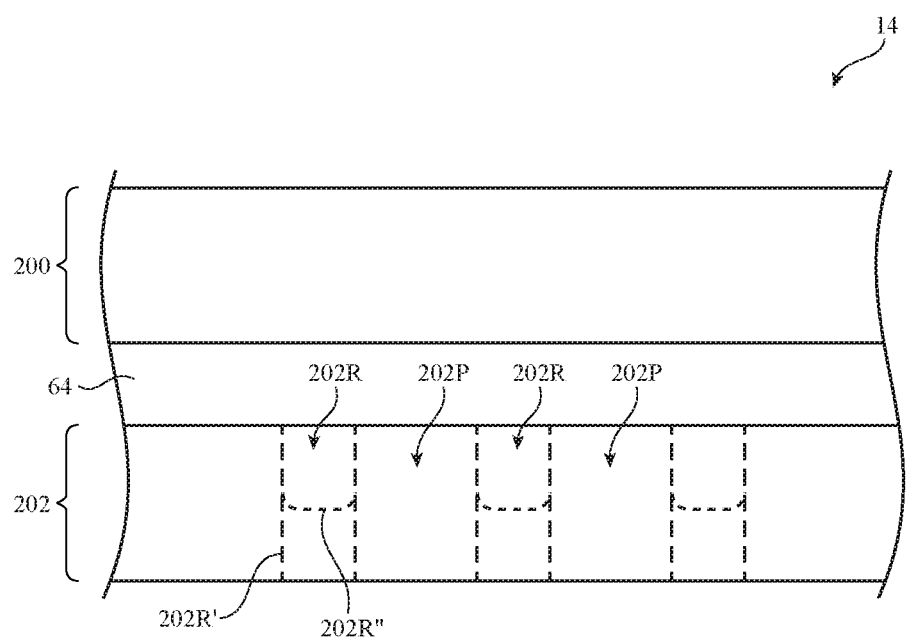
FIG. 26 is a cross-sectional side view of an illustrative display with air flow promotion structures formed from recesses in structures below an air gap in accordance with an embodiment.

FIG. 26 is a cross-sectional side view of display 14 in an illustrative configuration in which air flow promotion structures have been formed by forming openings 202R in layer 202. Layer 202 may include some or all of the layers below air gap 64 such as the layers forming electrodes 60 and/or 66 and/or layers 62, 68, 70, and 72 of FIGS. 7 and 8 and may be separated from display structures 52 (e.g., layer 200) by air gap 64. Openings 202R may pass through all of layer 202 as shown by illustrative openings 202R' or may protrude only partway through layer 202 as shown by illustrative recesses 202R". Openings 202R may be formed through electrodes such as electrodes 60 and/or 66, may be formed in gaps between electrodes, and/or may be formed in other portions of layer 202.

Protruding portions 202P of layer 202 are formed between respective openings 202R and may form spacer pads, texture on a spacer pad, or other air flow promotion structures. Recesses 202R in layer 202 may be formed by punching, laser drilling, machining, photolithography, or other suitable fabrication techniques. Openings 202R may be patterned to form circular openings, square openings, grooves, slots, air channels, and/or other air flow promotion shapes of the type described in connection with 10-23. Openings 202R may be formed in non-sensing portions of layer 202 or other portions of layer 202. Openings such as openings 202R in lower layer 202 may be formed in one or more of the layers of material above air gap 64 (see, e.g., display structures 52). The example of FIG. 26 in which openings 202R have been formed in lower layer 202 is merely illustrative.

Figure 27:
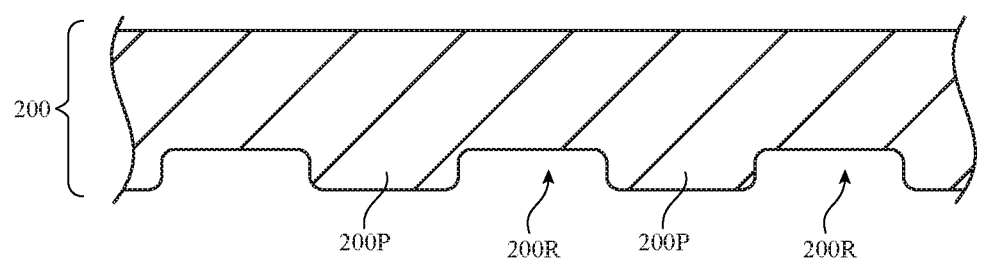
FIG. 27 is a cross-sectional side view of an illustrative display with air flow promotion structures formed from surface deformations on structures above an air gap in accordance with an embodiment.
Figure 28:
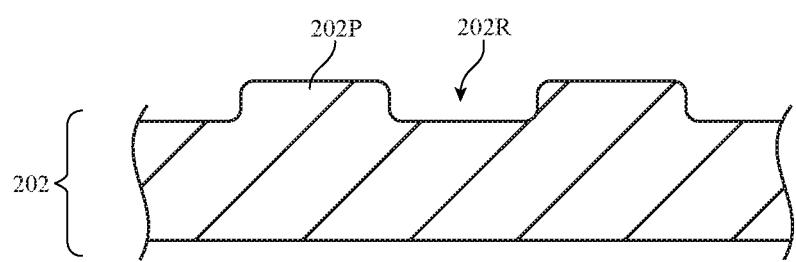
FIG. 28 is a cross-sectional side view of an illustrative display with air flow promotion structures formed from surface deformations on structures below an air gap in accordance with an embodiment.

FIG. 27 is a cross-sectional side view of a layer of material 200 above air gap 64 that has been provided with recesses 200R and corresponding protrusions 200P to form air flow promotion structures for display 14. Layer 200 may include one or more of display layers 52. Recesses 200R and protrusions 200P may be formed by deforming display layers (structures 52) under heat and/or pressure in a press with patterned raised portions and depressions, using laser drilling, using photolithography, using machining equipment, by building layers of material such as protrusions onto the lower surface of structures 52 using adhesive and additional layer(s) of material, or other suitable techniques. FIG. 28 shows how surface deformation techniques (e.g., compressing some or all of the layers of material in layer 202 with a press, etc.) can be used to create depressions such as recessed portions 202R and protrusions 202P in layer 202. Arrangements of the type shown in FIG. 27 may be used alone, arrangements of the type shown in FIG. 28 may be used alone, or arrangements of the type shown in FIGS. 27 and 28 may be used together. The recesses in the opposing surfaces above and/or below air gap 62 may serve as air flow promotion channels or other air flow promotion structures and may, if desired, form anti-stick surfaces for such structures, as described in connection with the structures of FIGS. 7-25. Protrusions 200P and/or 202P may form spacer pads, may form anti-stick textures, and/or may form other air flow promotion structures.

If desired, sensor structures such as electrodes 60 and 66, deformable layer 62, etc. (see, e.g., some or all of layer 202 of FIG. 28) may be formed on the lower surface of display structures 52 and may be deformed (e.g., bent inwardly) under pressure from a finger or other external object. In this situation, layer 202 of FIG. 28 may be located above air gap 64 and other structures (e.g., a battery, internal housing structures, and/or one or more other layers of material) may be located below air gap. When the outer sensor layers are bent inwardly by pressure from the user's finger, deformable layer 62 of the outer sensor layers will contact the battery or other internal layer, thereby deforming a portion of layer 62 and decreasing the spacing between electrodes 60 and 66 to produce a force signal. To promote airflow and to combat stiction effects, air flow promotion structures (e.g., shims, deformations, etc.) may be formed on the lower surface of the structures above air gap 64 (e.g., the lower surface of the sensor layers) and/or on the opposing upper surface of the battery or other layer(s) under air gap 64.

Figure 29:
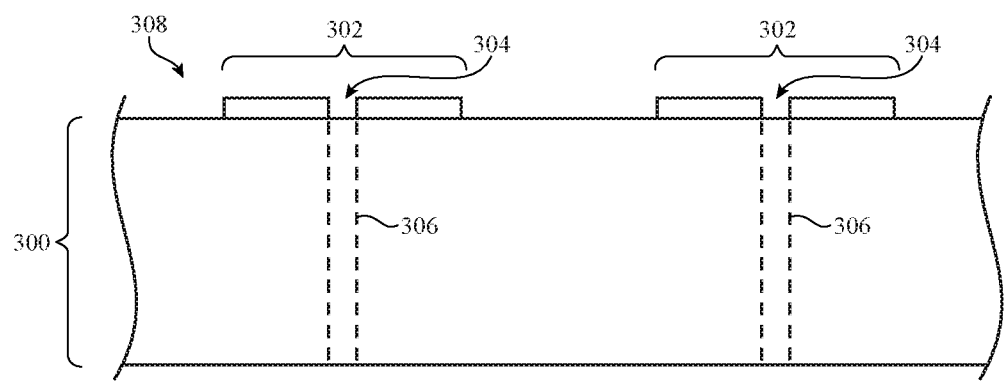
FIG. 29 is a cross-sectional side view of an illustrative layer that has air flow promotion structures formed from holes that pass through sensor electrodes in accordance with an embodiment.

As shown in FIG. 29, the recesses or other openings formed in the layers above or below air gap 64 may pass through sensor electrodes. In the example of FIG. 29, an array of capacitive force sensor electrodes 302 has been formed on layer 300. Layer 300 may be formed above or below air gap 64 and may include structures such as some or all of the structures of layers 200 and 202. In response to an applied external force, display structures or structures in device 10 may deform. This deformation may cause display structures or other structures to contact surface 308 of layer 300. Air flow promotion structures may be formed from openings that pass through some or all of layer 300, as illustrated by holes 306 and may include openings that pass through electrodes 302, as illustrated by holes 304. There may be any suitable number of holes such as holes 304 and 306 (e.g., one or more holes may be formed per electrode) and these holes may be circular, rectangular, or may have other suitable shapes. The illustrative configuration of FIG. 29 is shown as an example.

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
    first and second capacitive sensor electrodes separated by a deformable layer, wherein a distance between the first and second capacitive sensor electrodes changes when a force is applied by an external object;
    a layer that is separated from the first capacitive sensor electrode by an air gap and that deforms towards the first capacitive sensor electrode when the force is applied by the external object, wherein the first capacitive sensor electrode is interposed between the second capacitive sensor electrode and the layer; and
    air flow promotion structures interposed between the layer and the first capacitive sensor electrode to enhance air flow in the air gap when the force has been removed from the layer and the layer is moving away from the first capacitive sensor electrode.

2. The electronic device defined in claim 1 wherein the air flow promotion structures include at least one spacer pad.

3. The electronic device defined in claim 2 wherein the spacer pad has a textured anti-stick surface.

4. The electronic device defined in claim 2 wherein the spacer pad has a hydrophobic coating.

5. The electronic device defined in claim 2 wherein the spacer pad has an elastic modulus of at least 1 GPa and a height of 10-100 microns.

6. The electronic device defined in claim 2 wherein the spacer pad comprises a layer of polymer.

7. The electronic device defined in claim 6 further comprising a layer of adhesive that attaches the layer of polymer to the deformable layer.

8. The electronic device defined in claim 2 wherein the air flow promotion structures include a plurality of spacer pads including the at least one spacer pad.

9. The electronic device defined in claim 8 wherein the plurality of spacer pads include first spacer pads having a first height and second spacer pads having a second height that is different than the first height.

10. The electronic device defined in claim 1 wherein the deformable layer comprises an elastomeric polymer layer.

11. The electronic device defined in claim 10 wherein the first capacitive sensor electrode comprises one of a plurality of electrodes on the elastomeric polymer layer.

12. The electronic device defined in claim 1 further comprising a display, wherein the layer that is separated from the first capacitive sensor electrode by the air gap comprises part of the display.

13. The electronic device defined in claim 12 wherein the display includes a backlight unit and wherein the layer that is separated from the first capacitive sensor electrode by the air gap comprises part of the backlight unit.

14. An electronic device operable by a user with an external object, comprising:
    a housing;
    a display mounted in the housing, wherein the display has display layers that deform inwardly in response to pressure from the external object;
    a capacitive force sensor that measures force levels applied by the external object to the display layers by making capacitance measurements using first and second electrodes separated by an elastomeric layer, wherein a distance between the first and second electrodes changes in response to the pressure from the external object, and wherein the first electrode is located between the display layers and the second electrode; and
    an array of spacer pads covering the elastomeric layer, wherein the array of spacer pads is interposed between the display layers and the first electrode, wherein the display layers press against the array of spacer pads, and wherein the display layers compress the elastomeric layer when the display layers are bent inwardly.

15. The electronic device defined in claim 14 wherein the spacer pads include first spacer pads having a first height and second spacer pads having a second height that is different than the first height.

16. The electronic device defined in claim 15 wherein the first and second spacer pads are arranged in a checkerboard pattern on the elastomeric layer.

17. The electronic device defined in claim 14 further comprising touch sensor circuitry that makes position measurements on the external object.

18. An electronic device, comprising:
    a display that deforms inwardly when pressed with a force by an external object;
    an array of first capacitive electrodes on a first surface of an elastomeric layer;
    a second capacitive electrode on an opposing second surface of the elastomeric layer, wherein a distance between the array of first capacitive electrodes and the second capacitive electrode changes in response to the force, and wherein the array of first capacitive electrodes is located between the display and the second capacitive electrode;
    force sensing circuitry that measures the force by measuring capacitances between the first capacitive electrodes and the second capacitive electrode; and
    an array of spacer pads on the first surface of the elastomeric layer that are contacted by an inner surface of the display when the display deforms inwardly and thereby deforms the elastomeric layer and increases the measured capacitances, wherein the array of spacer pads is interposed between the display and the array of first capacitive electrodes.

19. The electronic device defined in claim 18 wherein the spacer pads include polymer layers.

20. The electronic device defined in claim 19 wherein the spacer pads have anti-stick surfaces.

21. An electronic device having an outer surface, comprising:
    first and second capacitive sensor electrodes separated by a deformable layer that is overlapped by the outer surface, wherein a distance between the first and second capacitive sensor electrodes changes when a force is applied to the outer surface by an external object;
    a layer that is separated from the deformable layer by an air gap, wherein the first capacitive sensor electrode is interposed between the layer and the second capacitive sensor electrode, wherein the air gap is interposed between the layer and the first capacitive sensor electrode, wherein the deformable layer and the layer that is separated from the deformable layer contact each other across the air gap when the force is applied to the outer surface by the external object; and air flow promotion structures that enhance air flow in the air gap when the force has been removed from the layer and the layer is moving away from the first capacitive sensor electrode.

22. The electronic device defined in claim 21 wherein the air flow promotion structures comprise openings in the deformable layer.

23. The electronic device defined in claim 21 wherein the air flow promotion structures comprise recesses in the deformable layer.

24. The electronic device defined in claim 23 wherein the recesses comprise deformations in the deformable layer.

25. The electronic device defined in claim 21 wherein the air flow promotion structures comprise deformations in the layer that is separated from the deformable layer by the air gap.

26. The electronic device defined in claim 21 further comprising a display, wherein the deformable layer is attached to the display.

27. The electronic device defined in claim 26 wherein the air flow promotion structures comprise an array of spacer pads on the deformable layer.

28. The electronic device defined in claim 21 further comprising a display, wherein the layer that is separated from the deformable layer is attached to the display.

29. The electronic device defined in claim 21 wherein the air flow promotion structures include at least one hole that passes through the first capacitive sensor electrode.

* * * * *